I. STEINER.
AUTOMATIC APPARATUS FOR WEIGHING DETERMINED ADJUSTABLE QUANTITIES OF MATERIALS.
APPLICATION FILED AUG. 31, 1911.
1,075,872. Patented Oct. 14, 1913.
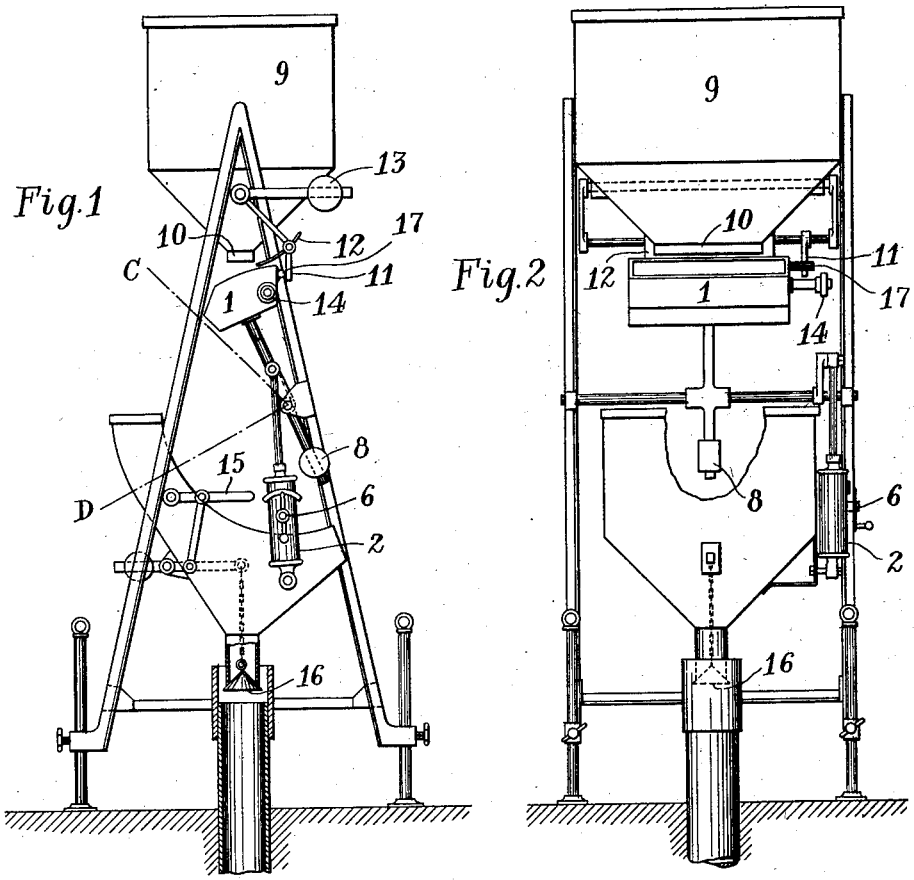
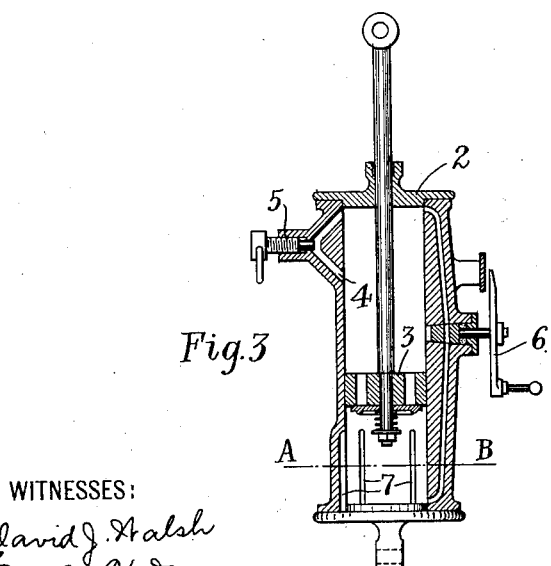
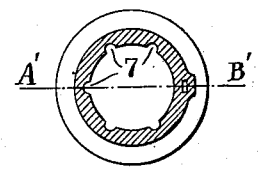
INVENTOR
ISIDOR STEINER

UNITED STATES PATENT OFFICE.

ISIDOR STEINER, OF MUNICH, GERMANY, ASSIGNOR OF ONE-HALF TO CHARLES ZOLLER, OF NEW YORK, N. Y.

AUTOMATIC APPARATUS FOR WEIGHING DETERMINED ADJUSTABLE QUANTITIES OF MATERIALS.

1,075,872.   Specification of Letters Patent.   Patented Oct. 14, 1913.

Application filed August 31, 1911. Serial No. 647,117.

*To all whom it may concern:*

Be it known that I, ISIDOR STEINER, a subject of the King of Bavaria, residing at No. 92/II Tegernseerlandstrasse, Munich, in the Kingdom of Bavaria, Germany, have invented certain new and useful Improvements in Automatic Apparatus for Weighing Determined Adjustable Quantities of Materials, of which the following is a specification.

This invention relates to automatic apparatus for weighing off determined adjustable quantities of materials in which the material is charged into a weighing vessel and discharged therefrom at a determined spot.

The improvements consist chiefly in effecting the movement of the weighing vessel by means of controlling mechanism (for instance a cylinder with a piston and controlling fluid, for instance glycerin) in such a manner that the weighing vessel is moved comparatively quickly from its position when full into a position C, then comparatively slowly from the position C into a position D, and then at the highest possible speed from the position D into position for discharging and thence into its initial position.

In the accompanying drawings:—Figure 1 is a side elevation of a practical construction of one example of the improved apparatus. Fig. 2 is a front elevation thereof, Fig. 3 is a longitudinal section of the controlling cylinder taken on the line A'—B' of Fig. 4, and Fig. 4 is a cross section on the line A—B of Fig. 3.

1 is a weighing vessel adapted to rock back and forth.

2 is a cylinder of the cataract type arranged on the side of the apparatus, filled with glycerin or the like, and containing a piston 3.

The motion of the weighing vessel is influenced by the glycerin cylinder in such a manner that the weighing vessel moves comparatively quickly from its top position into a position C, thence comparatively slowly into a position D, thence very quickly into its lowest position and thence very quickly through the entire way from its lowest position back into its top position. For this purpose the cylinder 2 is provided at its upper end with a by-pass valve 5 having a very large passage through it, in which the lower port 4 is covered and rendered inoperative by the piston 3 when the latter is in a corresponding position for this purpose (first stage of movement). The further descent of the piston 3 is dependent on the more or less rapid flow of the cataract liquid from one side of the cylinder to the other through a regulating valve 6 (second stage of movement, slow motion). When the weighing vessel has reached the position D, the ports 7 are uncovered by the piston 3, thereby allowing the glycerin to pass immediately from one side of the cylinder to the other (third stage; rapid motion; discharge). When the weighing vessel has been discharged it is moved rapidly upward by the action of the counterweight 8. During this movement the glycerin situated above the piston is enabled to flow with slight resistance through a valve situated on the underside of the piston (fourth stage; rapid motion).

The operation of the improved apparatus is as follows:—The material to be weighed which may be solid or liquid, for instance corn, or may be small coal for charging annular brick making furnaces, passes through an opening 10 into the weighing vessel 1 whereupon the latter descends into the position C. The duration of this movement depends on the quantity of material charged into the weighing vessel and may be regulated by means of the by-pass valve 5. This also allows of regulating the quantity of material to be discharged. In this movement the lever 11 becomes free and the flap 12 is closed by the counterweight 13. The weighing vessel 1 will now descend into the position D at a speed determined by the amount of opening of the regulating valve 6. When the weighing vessel 1 reaches the position D, the obstruction to the flow of the glycerin in the cylinder 2 is suddenly removed, so that the weighing vessel drops rapidly, and since the valve 16 is opened by the pin 14 through the medium of the levers 15, the weighing vessel is discharged. The discharged measuring vessel is rapidly tilted upward by the counterweight 8, causing the pin 17 to strike the lever of the flap 12 and opening the latter whereupon the series of operations begins anew.

The slow movement of the weighing vessel from the position C into the position D, is designed to cause the material contained in the weighing vessel 1 to be discharged therefrom at certain intervals of time. These intervals of time may be varied within certain limits at will by means of the regulating valve 6.

The movement of the weighing receptacle takes place, as stated in three stages: 1. Stage to position C comparatively rapid. 2. Stage C–D comparatively slowly. 3. Stage from D to the emptying position and back to the initial position as fast as possible. The reason for that is as follows: 1. Stage: An exact weighing of the mass to be discharged is obtained thereby, as experience has shown. The time of filling the weighing vessel is determined for the case under consideration and, as experience shows, the filling must take place rapidly in order to permit exact weighing. 2. Stage: This must take place comparatively slowly in order to permit such operation of the device that within a determined time a determined quantity passes the devices, for instance that the weighing vessel is emptied once each hour. This period is essentially determined by the slow movement of the weighing vessel from C to D, while to the emptying position it makes, so to speak, a "dead" run. 3. Stage: The emptying itself must take place rapidly. If it goes slowly there is the danger that the weighing vessel will not be entirely emptied; for the counterweight to the weighing would act too soon and the vessel would be raised before being completely emptied. For special purposes, as for instance the feeding of annular furnaces in brick works, it is absolutely necessary that the emptying take place as rapidly as possible, for the feeding aperture cannot, naturally remain open for very long. The return of the weighing vessel to the initial position must also take place rapidly so that so much force is imparted to the weighing vessel that it overcomes the resistance of the upper closing flap 12 in order to open the admission opening 10 to the weighing vessel.

Having now described my invention what I claim as new and desire to secure by Letters Patent is:—

1. In automatic apparatus for weighing off determined adjustable quantities of materials in a movable weighing vessel and discharging the weighed quantities at a determined point, the combination with the weighing vessel, of mechanism for influencing the movement of the weighing vessel due to the weight of the load in such a manner as to cause said vessel to move with less resistance from its position when charged into a first intermediate position, thence against a greater resistance into a second, intermediate position, and thence with much less resistance into its discharging position, and thence with still less resistance into its initial position for being charged, as set forth.

2. In automatic apparatus for weighing off determined adjustable quantities of materials in a movable weighing vessel and discharging the weighed quantities at a determined point, the combination with the weighing vessel, of mechanism of the cataract cylinder type for influencing the movement of the weighing vessel due to the weight of the load in such a manner as to cause said vessel to move with less resistance from its position when charged into a first intermediate position, thence against a greater resistance into a second intermediate position, and thence with much less resistance into its discharging position, and thence with still less resistance into its initial position for being charged, as set forth.

3. In automatic apparatus for weighing off determined adjustable quantities of materials in a movable weighing vessel and discharging the weighed quantities at a determined point, the combination with the weighing vessel, of mechanism of the cataract cylinder type for influencing the movement of the weighing vessel and a valve controlling the action of the cataract cylinder whereby the speed of travel of the weighing vessel in the first stage of its movement can be varied by regulating said valve for the purpose of varying the quantity of material discharged from the weighing vessel, as set forth.

4. In automatic apparatus for weighing off determined adjustable quantities of materials in a movable weighing vessel, and discharging the weighed quantities at a determined point, the combination with the weighing vessel, of mechanism of the cataract cylinder type for influencing the movement of the weighing vessel, and a valve controlling the action of the cataract cylinder whereby the speed of travel of the weighing vessel in the second stage of its movement can be varied by regulating said valve for the purpose of varying the time interval between two immediately successive discharges of the weighing vessel within determined limits at will, as set forth.

5. In automatic apparatus for weighing off determined adjustable quantities of materials in a movable weighing vessel, and discharging the weighed quantities at a determined point, the combination with the measuring vessel, of mechanism of the cataract cylinder type for influencing the movement of the weighing vessel, a receptacle containing the material to be measured adapted to charge said material into the weighing vessel an obturating device for cutting off the flow of material, from said receptacle into the measuring vessel, and means for automatically opening said obturating device on the return of the weighing vessel into its initial position, whereby the weighing vessel can be recharged anew immediately, as set forth.

6. In automatic apparatus for weighing off determined adjustable quantities of materials in a movable weighing vessel, and discharging the weighed quantities at a determined point, the combination with the weighing vessel, of mechanism of the cataract cylinder type for influencing the movement of the weighing vessel an actuating device adapted to be operated by the measuring vessel, a chute to receive the material discharged by the weighing vessel, and an obturating device normally closing the outlet of said chute, whereby the weighing vessel on moving into its discharging position automatically operates said actuating device to open said obturating device of said chute, and whereby on the weighing vessel returning into its initial position, said obturating device automatically closes again, as set forth.

In testimony whereof I have signed my name to this specification in the presence of two subscribing witnesses.

ISIDOR STEINER.

Witnesses:
JOSEPH HUBER,
ARTHUR V. M. COTTLE.

---

Copies of this patent may be obtained for five cents each, by addressing the "Commissioner of Patents, Washington, D. C."